United States Patent
Kato et al.

(10) Patent No.: US 9,986,250 B2
(45) Date of Patent: May 29, 2018

(54) DISPLAY DRIVING APPARATUS AND DRIVING METHOD THEREOF

(71) Applicant: Samsung Display Co., Ltd., Yongin, Gyeonggi-do (KR)

(72) Inventors: Takeshi Kato, Yongin (KR); Ji-Yeon Yang, Yongin (KR); Geun-Young Jeong, Yongin (KR); Byung-Hyun Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 73 days.

(21) Appl. No.: 14/553,761

(22) Filed: Nov. 25, 2014

(65) Prior Publication Data

US 2015/0146978 A1    May 28, 2015

(30) Foreign Application Priority Data

Nov. 28, 2013   (KR) .......................... 10-2013-0145818

(51) Int. Cl.
*H04N 19/186*   (2014.01)
*H04N 19/12*   (2014.01)

(52) U.S. Cl.
CPC .......... *H04N 19/186* (2014.11); *H04N 19/12* (2014.11)

(58) Field of Classification Search
None
See application file for complete search history.

(56) References Cited

U.S. PATENT DOCUMENTS

| 2008/0107349 A1 | 5/2008 | Sung et al. |
| 2008/0175489 A1* | 7/2008 | Lee ...................... H04N 19/176 382/232 |
| 2012/0120043 A1 | 5/2012 | Cho et al. |

FOREIGN PATENT DOCUMENTS

| JP | 2012-109970 A | 6/2012 |
| KR | 10-2012-0052739 A | 5/2012 |

OTHER PUBLICATIONS

Nouvoyance, Display Design and the Human Vision System Dec. 29, 2008.*

* cited by examiner

*Primary Examiner* — Gandhi Thirugnanam
*Assistant Examiner* — Jiangeng Sun
(74) *Attorney, Agent, or Firm* — Lewis Roca Rothgerber Christie LLP

(57) ABSTRACT

A display driving apparatus and a driving method may improve the compression rate of data. The display driving apparatus may include: an encoder configured to compress data of a Pentile method, using any one of a plurality of encoding methods, and compress the data according to a pattern encoding method in addition to the any one of the plurality of encoding methods when the data corresponds to a specific pattern; a decoder configured to decompress the data compressed in the encoder according to a decoding method corresponding to the any one of the encoding methods; and a data driver configured to generate a data signal using the data decompressed in the decoder.

18 Claims, 9 Drawing Sheets

| R_mode 4bit | | | | R1 8bit | R3 8bit | R5 8bit | R7 8bit |
|---|---|---|---|---|---|---|---|
| 0 | 0 | 0 | 0 | A | A | B | P |
| 0 | 0 | 0 | 1 | A | A | P | B |
| 0 | 0 | 1 | 0 | A | P | A | B |
| 0 | 0 | 1 | 1 | P | A | A | B |
| 0 | 1 | 0 | 0 | A | B | A | P |
| 0 | 1 | 0 | 1 | A | B | P | A |
| 0 | 1 | 1 | 0 | A | P | B | A |
| 0 | 1 | 1 | 1 | P | A | B | A |
| 1 | 0 | 0 | 0 | A | B | B | P |
| 1 | 0 | 0 | 1 | A | B | P | B |
| 1 | 0 | 1 | 0 | A | P | B | B |
| 1 | 0 | 1 | 1 | P | A | B | B |

⇩

| R_mode 4bit | RED_A 7bit | RED_B 7bit |
|---|---|---|

FIG. 6

| B_mode 4bit | | | | B2 8bit | B4 8bit | B6 8bit | B8 8bit |
|---|---|---|---|---|---|---|---|
| 0 | 0 | 0 | 0 | A | A | B | P |
| 0 | 0 | 0 | 1 | A | A | P | B |
| 0 | 0 | 1 | 0 | A | P | A | B |
| 0 | 0 | 1 | 1 | P | A | A | B |
| 0 | 1 | 0 | 0 | A | B | A | P |
| 0 | 1 | 0 | 1 | A | B | P | A |
| 0 | 1 | 1 | 0 | A | P | B | A |
| 0 | 1 | 1 | 1 | P | A | B | A |
| 1 | 0 | 0 | 0 | A | B | B | P |
| 1 | 0 | 0 | 1 | A | B | P | B |
| 1 | 0 | 1 | 0 | A | P | B | B |
| 1 | 0 | 1 | 1 | P | A | B | B |

⇓

| B_mode 4bit | BLUE_A 7bit | BLUE_B 7bit |
|---|---|---|

FIG. 7
| G_mode(P) 3bit | | | G1 8bit | G2 8bit | G3 8bit | G4 8bit | G5 8bit | G6 8bit | G7 8bit | G8 8bit |
|---|---|---|---|---|---|---|---|---|---|---|
| 0 | 0 | 0 | 1 | 2 | 3 | 4 | 5 | 6 | 7 | P |
| 0 | 0 | 1 | 1 | 2 | 3 | 4 | 5 | 6 | P | 7 |
| 0 | 1 | 0 | 1 | 2 | 3 | 4 | 5 | P | 6 | 7 |
| 0 | 1 | 1 | 1 | 2 | 3 | 4 | P | 5 | 6 | 7 |
| 1 | 0 | 0 | 1 | 2 | 3 | P | 4 | 5 | 6 | 7 |
| 1 | 0 | 1 | 1 | 2 | P | 3 | 4 | 5 | 6 | 7 |
| 1 | 1 | 0 | 1 | P | 2 | 3 | 4 | 5 | 6 | 7 |
| 1 | 1 | 1 | P | 1 | 2 | 3 | 4 | 5 | 6 | 7 |
| G_mode(D) 7bit | | | | | | | 1 | 2 | 3 | 4 | 5 | 6 | 7 |
|---|---|---|---|---|---|---|---|---|---|---|---|---|---|
| 0 | 0 | 0 | 0 | 0 | 0 | 0 | A | A | A | A | A | A | A |
| 0 | 0 | 0 | 0 | 0 | 0 | 1 | A | A | A | A | A | A | B |
| ⋮ | | | | | | | ⋮ | | | | | | |
| 1 | 1 | 1 | 1 | 1 | 1 | 1 | B | B | B | B | B | B | B |
| G_mode(P) 3bit | G_mode(D) 7bit | GREEN_A 7bit | GREEN_B 7bit |
|---|---|---|---|
FIG. 8
| Mode 4bit | R_mode 4bit | RED_A 7bit | RED_B 7bit | B_mode 4bit | BLUE_A 7bit | BLUE_B 7bit | G_mode (P) 3bit | G_mode (D) 4bit | GREEN_A 7bit | GREEN_B 7bit |
|---|---|---|---|---|---|---|---|---|---|---|

DISPLAY DRIVING APPARATUS AND DRIVING METHOD THEREOF

CROSS-REFERENCE TO RELATED APPLICATION

This application claims priority to and the benefit of Korean Patent Application No. 10-2013-0145818, filed on Nov. 28, 2013, in the Korean Intellectual Property Office, the entire content of which is incorporated herein by reference in their entirety.

BACKGROUND

1. Field

An aspect of the present invention relates to a display driving apparatus and a driving method thereof.

2. Description of the Related Art

With the development of information technologies, the importance of a display that is a medium for displaying information has increased. Accordingly, flat panel displays (FPDs) such as liquid crystal displays (LCDs), organic light emitting displays (OLEDs), and a plasma display panels (PDPs) are increasingly used.

SUMMARY

Aspects of embodiments of the present invention include a display driving apparatus and a driving method thereof, which can improve the compression rate of data.

According to aspects of embodiments of the present invention, a display driving apparatus includes: an encoder configured to compress data of a Pentile method, using any one of a plurality of encoding methods, and compress the data according to a pattern encoding method in addition to the any one of the plurality of encoding methods when the data corresponds to a specific pattern; a decoder configured to decompress the data compressed in the encoder according to a decoding method corresponding to the any one of the encoding methods; and a data driver configured to generate a data signal using the data decompressed in the decoder.

The encoder may be configured to pre-decompress the data compressed using the encoding methods, to compress the data using an encoding method of the encoding methods that has a smallest number of errors among the encoding methods, and to supply the data compressed using the encoding method to the decoder.

When the data corresponds to the specific pattern, the data compressed using the pattern encoding method may be supplied to the decoder.

The encoding methods may include a binary encoding method and a differential pulse code modulation (DPCM) encoding method.

The specific pattern may be a stripe pattern in which four pixels implement white and three pixels implement black for each column.

The encoder may include: a block generator configured to generate blocks each including a plurality of sub-pixel data, each sub-pixel data respectively corresponding to the plurality of encoding methods and the pattern encoding method; a first compression unit configured to compress the data according to the pattern encoding method; and a plurality of second compression units configured to compress the data respectively according to the plurality of encoding methods.

The block generator may be configured to generate a block including 16 sub-pixel data according to the pattern encoding method.

When an (i−1) (i is a natural number) block includes a last red sub-pixel data that once as a red sub-pixel data of an i block, and a last blue sub-pixel data once as a blue sub-pixel data of the i block, the first compression unit may determine the data corresponds to the specific pattern and performs compression.

When red sub-pixel data in an i (i is a natural number) block are compressed, the first compression unit may generate a first mode data corresponding to a pattern of three different red sub-pixel data having a last red sub-pixel data of an (i−1) block, and may generate red first and second data by removing a least significant bit of each of two data except the last red sub-pixel data of the (i−1) block among the three different red sub-pixel data, and when blue sub-pixel data in the i block are compressed, the first compression unit may generate a second mode data, corresponding to a pattern of three different blue sub-pixel data having a last blue sub-pixel data of the (i−1) block, and may generate blue first and second data by removing a least significant bit of each of two data except the last red sub-pixel data of the (i−1) block among the three different blue sub-pixel data.

The decoder may be configured to add "1" as a lowest bit when the red first and second data and the blue first and second data are decompressed.

The first compression unit may be configured to generate a third mode data representing a position of a last green sub-pixel data of an (i−1) (i is a natural number) block, a fourth mode data corresponding to the pattern of the data except the last green sub-pixel data, and green first and second data obtained by removing a lowest bit from two different data, when green sub-pixel data in the i block are compressed.

The decoder may be configured to add "1" as a lowest bit when the green first and second data are decompressed.

The encoder may include: a first pre-decompression unit coupled to the first compression unit, the first pre-decompression unit configured to decompress the data; a plurality of pre-decompression units respectively coupled to the plurality of compression units, and the plurality of pre-decompression units may be configured to decompress the data; a first error calculation unit coupled to the first pre-decompression unit, and the first error calculation unit may be configured to calculate an error; a plurality of error calculation units respectively coupled to the plurality of pre-decompression units, and the plurality of error calculation units may be configured to calculate an error; a mode selection unit that may be configured to output compression data corresponding to an error result of the first error calculation unit or one of the plurality of error calculation units; and a bit stream generator that may be configured to generate a bit stream by adding a mode data representing a compression method to the compression data supplied to the mode selection unit.

The display driving apparatus may further include a storage unit configured to store a data compressed in the encoder, and supply the stored data to the decoder.

According to aspects of embodiments of the present invention, in a method of driving a display driving apparatus, the method includes: compressing an input data of a Pentile method using any one of a plurality of encoding methods; compressing the input data according to a pattern encoding method in addition to the any one of the plurality of encoding methods when the input data corresponds to a specific pattern; calculating errors of the plurality of encoding methods and the pattern encoding method; and outputting the input data compressed according to an encoding method having a smallest number of errors among the plurality of encoding methods and the pattern encoding method.

When the input data is the specific pattern, the pattern encoding method may have the smallest number of errors.

The compressing of the input data in the pattern encoding method may include: generating blocks including 16 sub-pixel data according to the pattern encoding method; and respectively compressing a plurality of red sub-pixel data, a plurality of blue sub-pixel data, and a plurality of green sub-pixel data, which are in the block.

In the specific pattern, an (i−1) (i is a natural number) block may have a last red sub-pixel data that is a red sub-pixel data of an i block, and a last blue sub-pixel data that is a blue sub-pixel data of the i block.

When red sub-pixel data in the i block are compressed, a first mode data may be generated, corresponding to a pattern of three different red sub-pixel data having the last red sub-pixel data of the (i−1) block, and red first and second data may be generated by removing a least significant bit of each of two data except the last red sub-pixel data of the (i−1) block among the three different red sub-pixel data.

When blue sub-pixel data in the i block are compressed, a second mode data may be generated, corresponding to a pattern of three different blue sub-pixel data having the last blue sub-pixel data of the (i−1) block, and blue first and second data may be generated by removing a least significant bit of each of two data except the last red sub-pixel data of the (i−1) block among the three different blue sub-pixel data, and wherein, when green sub-pixel data in the i block are compressed, a third mode data representing a position of a last green sub-pixel data of the (i−1) block, a fourth mode data corresponding to the pattern of data except the last green sub-pixel data, and green first and second data obtained by removing a lowest bit from two different data may be generated.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be more thorough and more complete, and will more fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating an embodiment of a process in which a blue sub-pixel data is compressed in a first compression unit.

FIG. 7 is a diagram illustrating an embodiment of a process in which a green sub-pixel data is compressed in a first compression unit.

FIG. 8 is a diagram illustrating a compression data generated in a bit stream generator.

DETAILED DESCRIPTION

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Figure 1A:
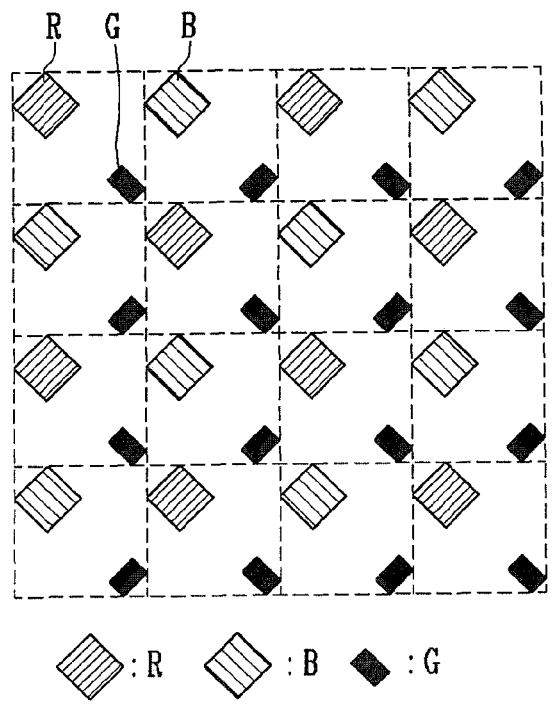
FIGS. 1A and 1B are diagrams illustrating a Pentile-type pixel arrangement structure.
Figure 1B:
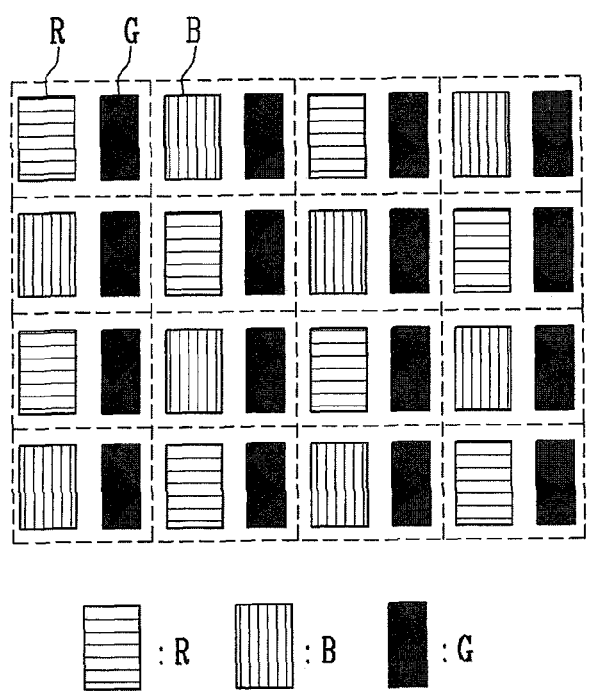

FIGS. 1A and 1B are diagrams illustrating a Pentile-type pixel arrangement structure.

Referring to FIGS. 1A and 1B, in the Pentile-type pixel arrangement structure, red and blue sub-pixels R and B are repetitively arranged in an alternating pattern on a column (e.g., a specific column), and green sub-pixels G are repetitively arranged in another column adjacent to the column in which the red and blue sub-pixels R and B are arranged (e.g., adjacent to the specific column).

In addition, adjacent red and green sub-pixels R and G in a column constitute one pixel, and adjacent blue and green sub-pixels B and G in a column constitute one pixel. When assuming that the red and green sub-pixels R and G in a column constitute a first pixel, and the blue and green sub-pixels B and G in a column constitute a second pixel, the first and second pixels are alternately arranged along horizontal and vertical lines. Thus, second pixels are positioned at the top, bottom, left and right of the first pixel formed at a given position.

Figure 2:
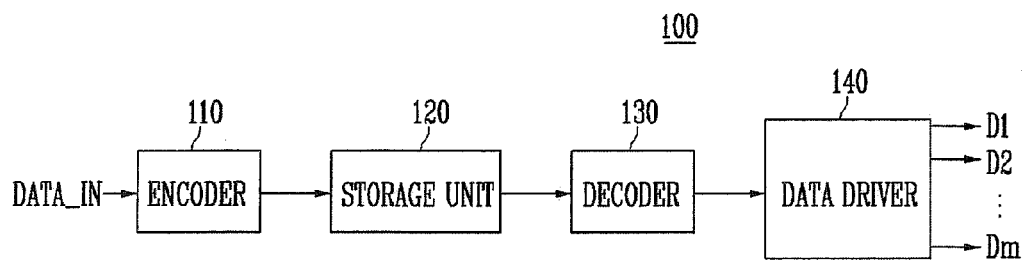
FIG. 2 is a diagram briefly illustrating a display driving apparatus according to an embodiment of the present invention.

FIG. 2 is a diagram briefly illustrating a display driving apparatus according to an embodiment of the present invention.

Referring to FIG. 2, the display driving apparatus 100 includes an encoder 110, a storage unit 120, a decoder 130, and a data driver 140.

The encoder 110 compresses an input data DATA_IN, using a plurality of encoding methods. For example, the encoder 110 compresses the input data DATA_IN, using a binary encoding method and a differential pulse code modulation (DPCM) encoding method. When a specific pattern is input, the encoder 110 compresses the input data DATA_IN, using a pattern encoding method, so that the compression rate and error rate of the specific pattern are minimized.

The encoder 110 compressing the input data DATA_IN calculates errors, and compresses the input data DATA_IN, using a compression method having a relatively small number of errors. When a specific pattern is input, the smallest number of errors is detected in a predetermined pattern encoding method, and accordingly, the pattern encoding method is used for the specific pattern. The pattern encoding method used in the present invention will be described in more detail later.

The storage unit 120 stores a data compressed by the encoder 110. The storage unit 120 provides the stored data to the decoder 130.

The decoder 130 decompresses the compressed data by selectively applying any one of a plurality of decoding methods. For example, the decoder 130 decompresses the compressed data by applying decoding methods corresponding to the respective encoding methods. In other words, the data compressed using the binary encoding method is decompressed by applying a binary decoding method, and the data compressed using the DPCM encoding method is decompressed by applying a DPCM decoding method. In addition, the data compressed using the pattern encoding method is decompressed by applying a pattern decoding method.

The data driver 140 generates a data signal, using the data decompressed by the decoder 130, and supplies the generated data signal to data lines D1 to Dm.

Figure 3:
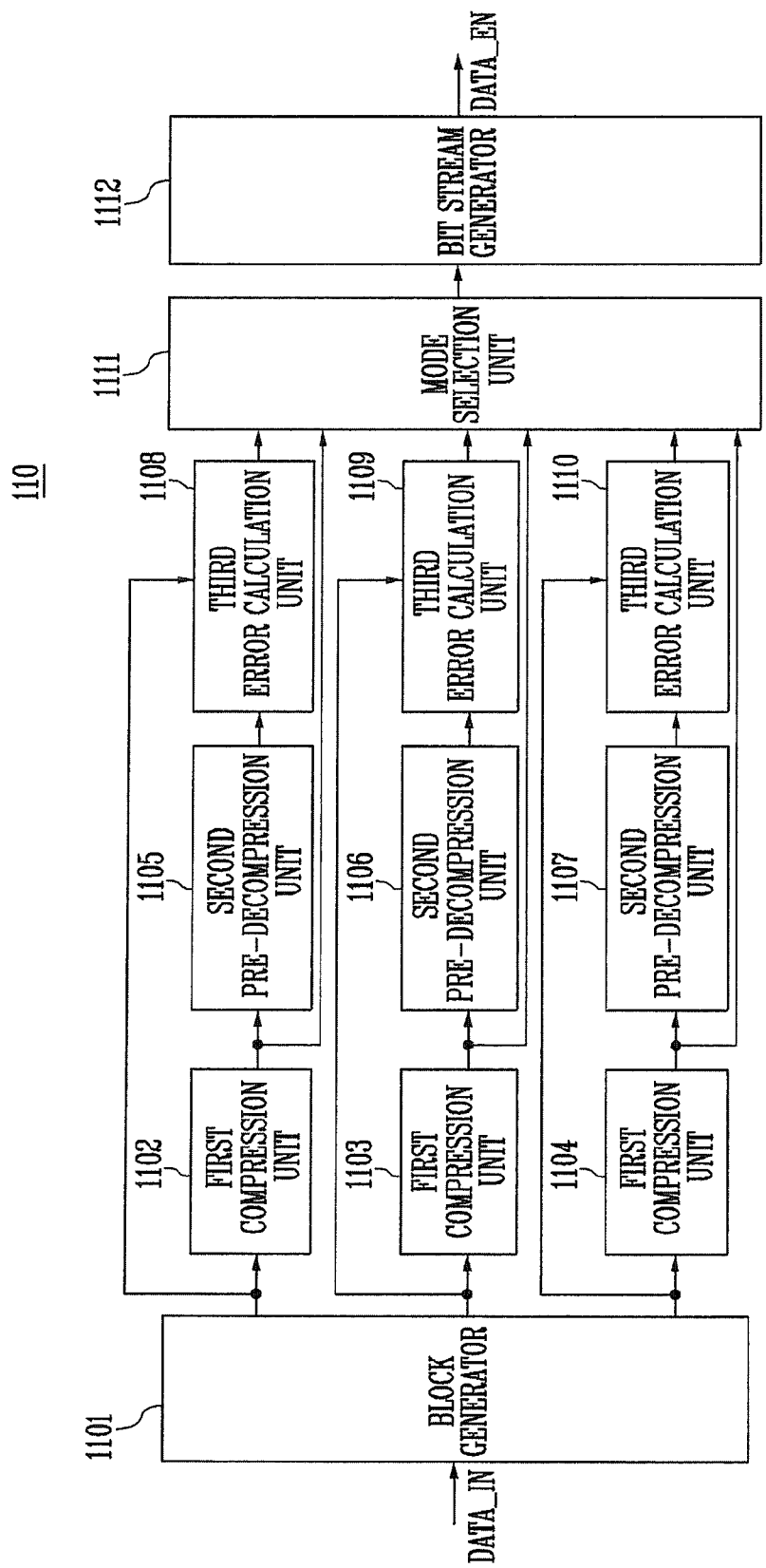
FIG. 3 is a diagram illustrating an embodiment of the encoder shown in FIG. 2.

FIG. 3 is a diagram illustrating an embodiment of the encoder shown in FIG. 2.

Referring to FIG. 3, the encoder 110 according to one embodiment includes a block generator 1101, a plurality of compression units 1102, 1103, and 1104, a plurality of pre-decompression units 1105, 1106, and 1107, a plurality of error calculation units 1108, 1109, and 1110, a mode selection unit 1111 and a bit stream generator 1112.

The block generator 1101 generates a block suitable for a compression method, corresponding to the input data DATA_IN. That is, the block generator 1101 generates blocks respectively corresponding to a plurality of compression methods so that input data DATA_IN input corresponding to the Pentile-type pixel arrangement structure can be compressed using the plurality of compression methods. For example, the block generator 1101 divides the input data DATA_IN into predetermined blocks each including a plurality of sub-pixels to respectively correspond to the binary encoding method, the DPCM encoding method and the pattern encoding method. The pattern encoding method will be described in more detail later.

When an input data DATA_IN having a specific pattern is supplied, a first compression unit 1102 compresses a data for each block, using the pattern encoding method. When the input data DATA_IN does not have the specific pattern, the first compression unit 1102 does not compress the data. That is, when the input data DATA_IN does not have the specific pattern, the input data DATA_IN is compressed by second or third compression unit 1103 or 1104.

The second compression unit 1103 compresses a data for each block, using the binary encoding method. In the binary encoding method, the data is compressed using an average value of sub-pixel data included in the block. The second compression unit 1103 may use various types of binary encoding methods currently known in the art.

The third compression unit 1104 compresses a data for each block, using the DPCM encoding method. In the DPCM encoding method, the data is compressed using the correlation of sub-pixel data included in the block. The third compression unit 1104 may use various types of DPCM encoding methods current known in the art.

Additionally, the present invention is related to the pattern encoding method of compressing the data corresponding to the specific pattern (e.g., using the first compression unit 1102). Therefore, some detailed descriptions related to the plurality of compression units 1103 and 1104 coupled in parallel to the first compression unit 1102 will be omitted.

A first pre-decompression unit 1105 decompresses, for each block, the data compressed using the pattern encoding method. For example, the first pre-decompression unit 1105 decompresses the data compressed using the pattern encoding method by reciprocally performing the pattern encoding method.

A second pre-decompression unit 1106 decompresses the data compressed using the binary encoding method for each block. For example, the second pre-decompression unit 1106 decompresses the data compressed using the binary encoding method by reciprocally performing the binary encoding method.

A third pre-decompression unit 1107 decompresses, for each block, the data compressed using the DPCM encoding method. For example, the third pre-decompression unit 1107 decompresses the data compressed using the DPCM encoding method by reciprocally performing the DPCM encoding method.

A first error calculation unit 1108 calculates, for each block, a difference value (hereinafter, referred to as a "first error") between the input data DATA_IN and the data compressed by the first compression unit 1102 and decompressed by the first pre-decompression unit 1105.

A second error calculation unit 1109 calculates, for each block, a difference value (hereinafter, referred to as a "second error") between the input data DATA_IN and the data compressed by the second compression unit 1103 and decompressed by the second pre-decompression unit 1106.

A third error calculation unit 1110 calculates, for each block, a difference value (hereinafter, referred to as a "third error") between the input data DATA_IN and the data compressed by the third compression unit 1104 and decompressed by the third pre-decompression unit 1107.

The mode selection unit 1111 selects any one compression method, based on the comparison result of the first to third errors. In other words, the mode selection unit 1111 selects a mode corresponding to the smallest value among the first to third errors, and outputs a compression data corresponding to the selected mode. When a specific pattern is input as the input data DATA_IN, the first error has the smallest value, and accordingly, the mode selection unit 1111 supplies the data compressed by the first compression unit 1102 to the bit stream generator 1112. When the input data DATA_IN is not the specific pattern, the mode selection unit 1111 supplies, to the bit stream generator 1112, the data compressed by the compression unit 1103 or 1104, corresponding to the smallest value out of the second and third errors.

The bit stream generator 1112 generates a bit stream DATA_EN by adding a mode data indicating a compression method to the compressed data. The generated bit stream DATA_EN is supplied to the storage unit 120.

Figures 4, 5:
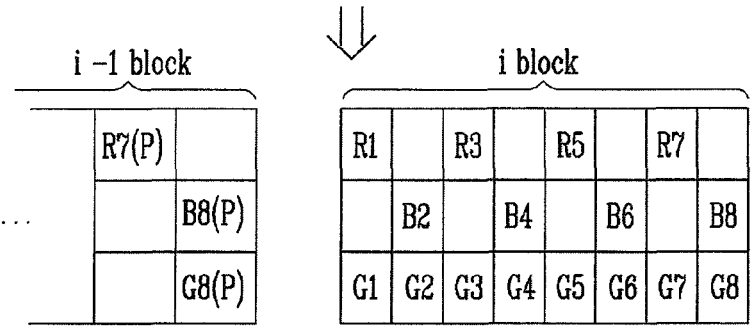
FIG. 4 is a diagram illustrating an embodiment of a block generated in a block generator, corresponding to a specific pattern.
FIG. 5 is a diagram illustrating an embodiment of a process in which a red sub-pixel data is compressed in a first compression unit.

FIG. 4 is a diagram illustrating an embodiment of a block generated in the block generator, corresponding to a specific pattern.

Referring to FIG. 4, the block generator 1101 defines data for consecutively input eight pixels as one block. That is, an i (i is a natural number) block includes eight pixels (e.g., 16 sub-pixel data R1, G1, . . . , R8 and G8).

Subsequently, the block generator 1101 reconfigures each block for each color. The block generator 1101 divides the block into red sub-pixel data R1, R3, R5, and R7, blue sub-pixel data B2, B4, B6, and B8, and green sub-pixel data G1 to G8. Because the input data is supplied using a Pentile method, four red sub-pixel data and four blue sub-pixel data are included in each block, and eight green sub-pixel data are included in each block.

Meanwhile, according to embodiments of the present invention, the pattern encoding method is applied to a specific pattern (e.g., a data for displaying a stripe image). In this case, any one of the red sub-pixel data R1, R3, R5, and R7 included in the i block is set as a data identical to the last red sub-pixel data R7(P) included in an (i−1) block. In addition, three red sub-pixel data (three sub-pixel data among R1, R3, R5, and R7) included in the i block are set as any one sub-pixel data out of "A" and "B". That is, in the specific pattern applied to the present invention, the red sub-pixel data R1, R3, R5, and R7 included in the i block include sub-pixel data of "A", "B" and R7(P). Here, the "A" and "B" mean different data, which represent a gray level value (e.g., a predetermined gray level value) corresponding to the specific pattern.

Any one of the blue sub-pixel data B2, B4, B6, and B8 included in the i block is set as a data identical to the last blue sub-pixel data R8(P) included in the (i−1) block. In addition, three blue sub-pixel data (e.g., three sub-pixel data among B2, B4, B6, and B8) included in the i block are set as any one sub-pixel data out of "A" and "B". That is, in the specific pattern according to embodiments of the present invention, the blue sub-pixel data B2, B4, B6, and B8 included in the i block include sub-pixel data of "A," "B," and R8(P). Additionally, the "A" and "B" of the blue sub-pixel data may be set as data identical to or different from those of the green sub-pixel data.

At least one of the green sub-pixel data G1 to G8 included in the i block is set as a data identical to the last green sub-pixel data G8(P) included in the (i−1) block. In addition, seven blue sub-pixel data (seven sub-pixel data among G1 to G8) included in the i block are set as any one sub-pixel data out of "A" and "B". That is, in the specific pattern according to embodiments of the present invention, the green sub-pixel data G1 to G8 included in the i block include sub-pixel data of "A," "B," and G8(P). Here, the G8(P) may be set as a data identical to the "A" or "B". Additionally, the "A" and "B" of the green sub-pixel data may be set as data identical to or different from those of the red and blue sub-pixel data.

The specific pattern of the present invention will be described in some detail later.

FIG. 5 is a diagram illustrating an embodiment of a process in which a red sub-pixel data is compressed in the first compression unit.

Referring to FIG. 5, the first compression unit 1102 detects a data pattern of the red sub-pixel data R1, R3, R5, and R7. For example, the first compression unit 1102 may generate a 4-bit first mode data R_mode of "0000", corresponding to the data pattern of "A", "A", "B" and "P" (P is the last red sub-pixel data of the previous block) of the red sub-pixel data R1, R3, R5, and R7. Actually, the first compression unit 1102 generates the first mode data R_mode of "0000" to "1011", corresponding to the data pattern of the red sub-pixel data R1, R3, R5 and R7.

Subsequently, the first compression unit 1102 generates a red compression data obtained by adding up the first mode data R_mode, a red first data RED_A obtained by removing a least significant bit (hereinafter, referred to as a "LSB") from the "A" data, and a red second data RED_B obtained by removing an LSB from the "B" data. Here, the red compression data is set to 18 bits obtained by adding up 4 bits of the first mode data R_mode, 7 bits of the red first data RED_A and 7 bits of the red second data RED_B. That is, the first compression unit 1102 generates an 18-bit red compression data by compressing 32 bits (8 bits×4) of the red sub-pixel data R1, R3, R5 and R7.

Meanwhile, when the red data of the i block does not include the last red sub-pixel data R7(P) of the (i−1) block or includes the last red sub-pixel data R7(P) twice or more, the first compression unit 1102 determines that the pattern is not one according to embodiments of the present invention. Accordingly, the first compression unit 1102 does not perform compression.

FIG. 6 is a diagram illustrating an embodiment of a process in which a blue sub-pixel data is compressed in the first compression unit.

Referring to FIG. 6, the first compression unit 1102 detects a data pattern of the blue sub-pixel data B2, B4, B6, and B8. For example, the first compression unit 1102 may generate a 4-bit second mode data B_mode of "0000", corresponding to the data pattern of "A", "A", "B", and "P" (P is the last blue sub-pixel data of the previous block) of the blue sub-pixel data B2, B4, B6, and B8. Actually, the first compression unit 1102 generates the second mode data B_mode of "0000" to "1011", corresponding to the data pattern of the blue sub-pixel data B2, B4, B6, and B8.

Subsequently, the first compression unit 1102 generates a blue compression data obtained by adding up the second mode data B_mode, a blue first data BLUE_A obtained by removing an LSB from the "A" data, and a blue second data BLUE_B obtained by removing an LSB from the "B" data. Here, the blue compression data is set to 18 bits obtained by adding up 4 bits of the second mode data B_mode, 7 bits of the blue first data BLUE_A, and 7 bits of the blue second data BLUE_B. That is, the first compression unit 1102 generates an 18-bit blue compression data by compressing 32 bits (8 bits×4) of the blue sub-pixel data B2, B4, B6, and B8.

Meanwhile, when the blue data of the i block does not include the last blue sub-pixel data B8(P) of the (i−1) block or includes the last blue sub-pixel data R8(P) twice or more, the first compression unit 1102 decides that the pattern is not one according to embodiments of the present invention. Accordingly, the first compression unit 1102 does not perform compression.

FIG. 7 is a diagram illustrating an embodiment of a process in which a green sub-pixel data is compressed in the first compression unit.

Referring to FIG. 7, the first compression unit 1102 detects a data pattern of the green sub-pixel data G1 to G8, and generates a third mode data G_mode(P) and a fourth mode data G_mode(D), corresponding to the detected data.

For example, the first compression unit 1102 detects the position of the last green sub-pixel data P of the previous block in the green sub-pixel data G1 to G8. Here, the last green sub-pixel data P of the previous block is set as any one data among the first to eighth green sub-pixel data G1 to G8. Meanwhile, when the last green sub-pixel data P of the previous block is identical to the "A" (or "B") data, any one of the "A" (or "B") data may be assigned as "P". The first compression unit 1102 detecting the position of the last green sub-pixel data P of the previous block generates the third mode data G_mode(P) set to any one value among "000" to "111", corresponding to the position of the last green sub-pixel data P.

Subsequently, the first compression unit 1102 detects seven sub-pixel data except a green sub-pixel data (any one of G1 to G8) having the last green sub-pixel data P of the previous block, and generates the fourth mode data G_mode (D), corresponding to the detected data. For example, the first compression unit 1102 assigns a bit of "0", corresponding to the data of "A", and assigns a bit of "1", corresponding to the data of "B", thereby generating the fourth mode data G_mode(D).

Subsequently, the first compression unit 1102 generates a green compression data obtained by adding up the third mode data G_mode(P), the fourth mode data G_mode(D), a green first data GREEN_A obtained by removing an LSB from the data of "A", and a green second data GREEN_B obtained by removing an LSB from the data of "B". Here, the green compression data is set to 24 bits obtained by adding up 3 bits of the third mode data G_mode(P), 7 bits of the fourth mode data G_mode(D), 7 bits of the green first data GREEN_A, and 7 bits of the green second data GREEN_B. That is, the first compression unit 1102 generates a 24-bit green compression data by compressing 64 bits of the green sub-pixel data G1 to G8.

Meanwhile, when a specific pattern is input, the mode selection unit 1111 supplies, to the bit stream generator 1112, the red, blue, and green compression data generated in the first compression unit 1102.

FIG. 8 is a diagram illustrating a compression data generated in the bit stream generator.

Referring to FIG. 8, the bit stream generator 1112 generates a 64-bit bit stream DATA_EN by adding a 4-bit mode data Mode to the red, blue, and green compression data. In this case, a 128-bit input data DATA_IN is compressed as the 64-bit bit stream DATA_EN at a compression rate of 50%.

Meanwhile, the mode data Mode represents a method of compressing a data. For example, when the mode data Mode is set to "0000", the data is compressed by the pattern encoding method according to embodiments of the present invention. Here, the mode data Mode is set to 4 bits, and hence various specific patterns may be additionally used. In other words, at least one compression unit is additionally formed in parallel to the first compression unit 1102, corresponding to the various specific patterns, and the added compression unit compresses a specific pattern (e.g., a predetermined specific pattern), thereby improving the compression rate and also minimizing the number of errors.

The bit stream DATA_EN generated in the bit stream generator 1112 is stored in the storage unit 120. In the decoder 130, the bit stream DATA_EN stored in the storage unit 120 is decompressed in the reciprocal order of the pattern encoding method. Here, "1" is added as an LSB bit of each data. In this case, the maximum error is set to "1" in the decompression, and accordingly, it is possible to decrease an error rate. When the i block is decompressed, the decoder 130 decompresses a data corresponding to "P", using the last red, green, and blue sub-pixel data included in the i block.

Figure 9:
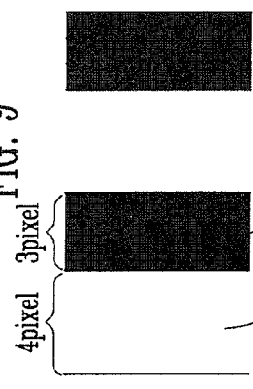
FIG. 9 is a diagram illustrating a specific pattern to which a pattern encoding method of the present invention is applied.

FIG. 9 is a diagram illustrating a specific pattern to which the pattern encoding method of the present invention is applied.

Referring to FIG. 9, an example specific pattern according an embodiment of the present invention is a stripe pattern, which implements four pixels of white and three pixels of black for each column. When the stripe pattern is displayed, a sub-pixel data corresponding to the gray level of "0" is supplied to sub-pixels implementing the black, a sub-pixel data corresponding to the gray level of "255" is supplied to sub-pixels implementing the white, and a sub-pixel data corresponding to the gray level of "188" is supplied to sub-pixels positioned at the boundary between the black and white.

When such a specific pattern is displayed, the sub-pixels R1 to G8 included in the i block respectively receive sub-pixel data corresponding to gray scales of "255", "255", "255" "255", "255" "255" "188" "0" "0", "0", "0", "0" "188", "255" "255", and "255".

The red fifth sub-pixel data R5 included in the i block is set as a data (i.e., the gray level of "0") identical to the last sub-pixel data of the (i−1) block, the red first and third sub-pixel data R1 and R3 are set as the "A" data corresponding to the gray scale of "255", and the red seventh sub-pixel data R7 is set as the "B" data corresponding to the gray scale of "188". Then, the red sub-pixel data of the i block is set to a data pattern of "A", "A", "P" and "B". The first compression unit 1102 generates "0001" corresponding to the data pattern of "A", "A", "P" and "B" as the first mode data R_mode, generates "1111111" obtained by removing the LSB from the "A" data as the red first data RED_A, and generates "1011110" obtained by removing the LSB from the "B" data as the red second data RED_B.

The blue fourth sub-pixel data B4 included in the i block is set as a data (e.g., the gray level of "188") identical to the last sub-pixel data of the (i−1) block, the blue second sub-pixel data B2, and the blue eighth sub-pixel data B8 are set as the "A" data corresponding to the gray level of "255", and the blue sixth sub-pixel data B6 is set as the "B" data corresponding to the gray level of "0". Then, the blue sub-pixel data of the i block is set to a data pattern of "A", "P", "B", and "A". The first compression unit 1102 generates "0110" corresponding to the data pattern of "A", "P", "B", and "A" as the second mode data B_mode, generates "1111111" obtained by removing the LSB from the "A" data as the blue first data BLUE_A, and generates "0000000" obtained by removing the LSB from the "B" data as the blue second data BLUE_B.

The last green sub-pixel data G8(P) included in the (i−1) block has the gray level of "255". In this case, the green first sub-pixel data G1 among the sub-pixel data having the gray level of "255", which are included in the i block, is set as a data identical to that of the previous sub-pixel (e.g., the first green sub-pixel data G1 is set as "P"). In addition, the green second, third, seventh, and eighth sub-pixel data G2, G3, G7, and G8 having the gray level of "255" are set as the data of "A", and the green fourth to sixth sub-pixel data G4 to G6 having the gray level of "0" are set as the data of "B". Then, the green sub-pixel data of the i block is set to a data pattern of "P", "A", "A", "B", "B", "B", "A" and "A". The first compression unit 1102 generates "111" and "0011100" as the third mode data G_mode(P) and the fourth mode data G_mode (D), corresponding to the data pattern of "P", "A", "A", "B", "B", "B", "A", and "A", generates "1111111" obtained by removing the LSB from the data of "A" as the green first data GREEN_A, and generates "0000000" obtained by removing the LSB from the data of "B" as the green second data GREEN_B.

Subsequently, the bit stream generator 1112 generates a 64-bit bit stream DATA_EN by adding a 4-bit mode data Mode to the red, blue, and green compression data.

Figure 10:
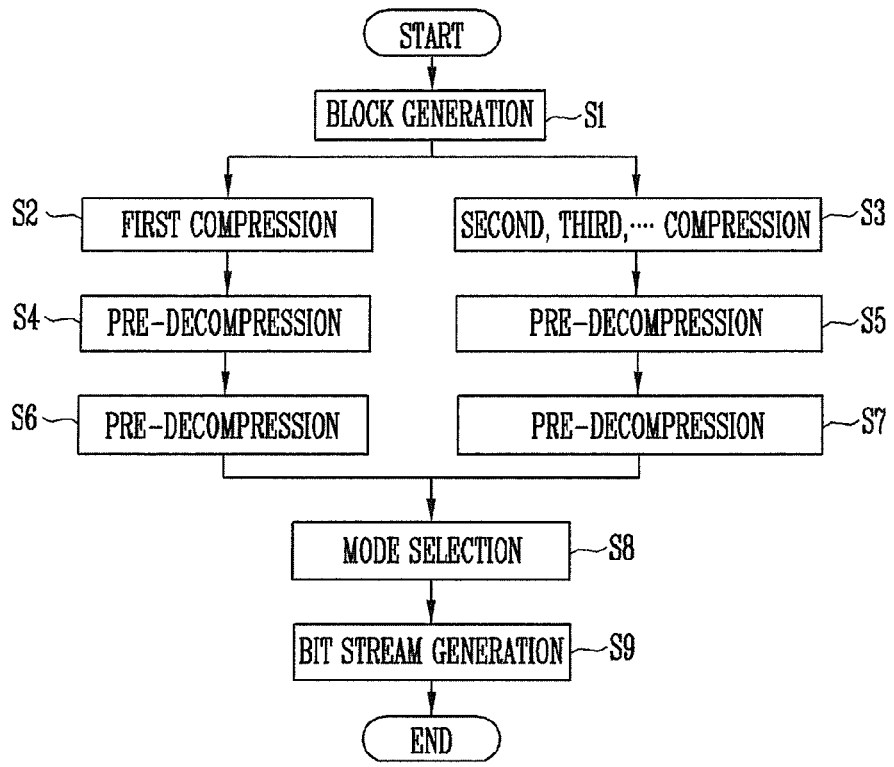
FIG. 10 is a flowchart illustrating an embodiment of a compression method of an embodiment of the present invention.

FIG. 10 is a flowchart illustrating an embodiment of the compression method of the present invention.

Referring to FIG. 10, the block generator 1101 receives an input data DATA_IN, and generates the received input data DATA_IN as blocks each including a plurality of data, corresponding to various compression methods (S1).

After the blocks are generated, the first compression unit 1102 compresses the blocks, corresponding to the pattern encoding method (S2).

After the blocks are generated, the compression units 1103 and 1104, except the first compression unit 1102, compress the blocks, using a compression method (e.g., a predetermined compression method) (S3). For example, in step S3, the blocks may be compressed through the binary encoding method, the DPCM encoding method, and the like.

Subsequently, the blocks compressed using the respective compression methods are pre-decompressed, and errors of the decompressed blocks are detected (S4, S5, S6, and S7).

After the errors of the decompressed blocks are detected, the encoding method having the smallest number of errors is selected (S8). When a specific pattern is input to the input data DATA_IN, the encoding method having the smallest number of errors is selected. Subsequently, the bit stream generator 1112 generates a bit stream DATA_EN by adding a mode data to the data compressed using the encoding method selected in step S8 (S9).

Figure 11:
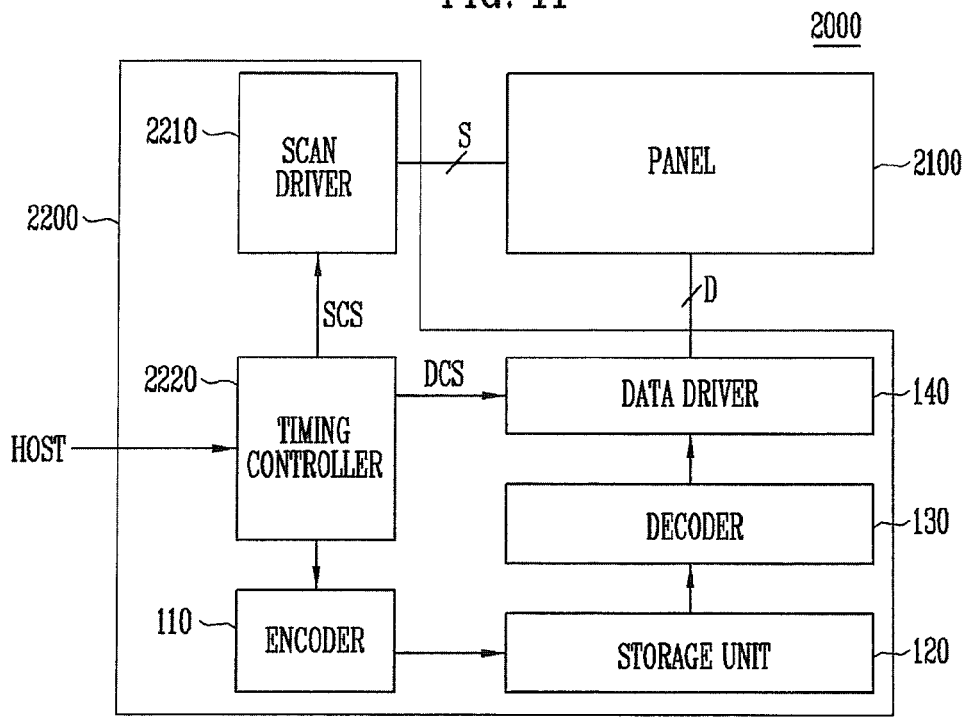
FIG. 11 is a diagram illustrating an embodiment of a display device including the display driving apparatus of the present invention.

FIG. 11 is a diagram illustrating an embodiment of a display device including the display driving apparatus of the present invention.

Referring to FIG. 11, the display device 2000 includes a panel 2100 and a driving apparatus 2200.

The panel 2100 includes pixels (not shown) arranged in a Pentile pattern. The panel 2100 is coupled to the driving apparatus 2200 through scan lines S and data lines D. The pixels are respectively positioned in areas defined by the scan lines S and the data lines D.

The driving apparatus 2200 includes a scan driver 2210, a timing controller 2220, an encoder 110, a storage unit 120, a decoder 130 and a data driver 140.

The scan driver 2210 supplies a scan signal to the scan lines S, corresponding to a scan driving control signal SCS supplied from the timing controller 2220.

The encoder 110 compresses an input data supplied from the timing controller 2220, using a predetermined encoding method, and stores the compressed input data in the storage unit 120. When a specific pattern is input, the encoder 110 compresses the input data, using the pattern encoding method described above.

The storage unit 120 stores a data compressed in the encoder 110.

The decoder 130 decompresses the compressed data stored in the storage unit 120 as the original data.

The data driver 140 supplies a data signal to the data lines D, corresponding to a data driving control signal DCS supplied from the timing controller 2220. Here, the data signal is generated by the decompressed data supplied from the decoder 130.

The timing controller 2220 receives synchronization signals and data from a host HOST. The timing controller 2220 receiving the synchronization signals generates a scan driving control signal SCS and supplies the generated scan driving control signal SCS to the scan driver 2210. The timing controller 2220 generates a data driving control signal DCS and supplies the generated data driving control signal DCS to the data driver 140. The timing controller 2220 supplies the data supplied from the host HOST to the encoder 110.

Figure 12:
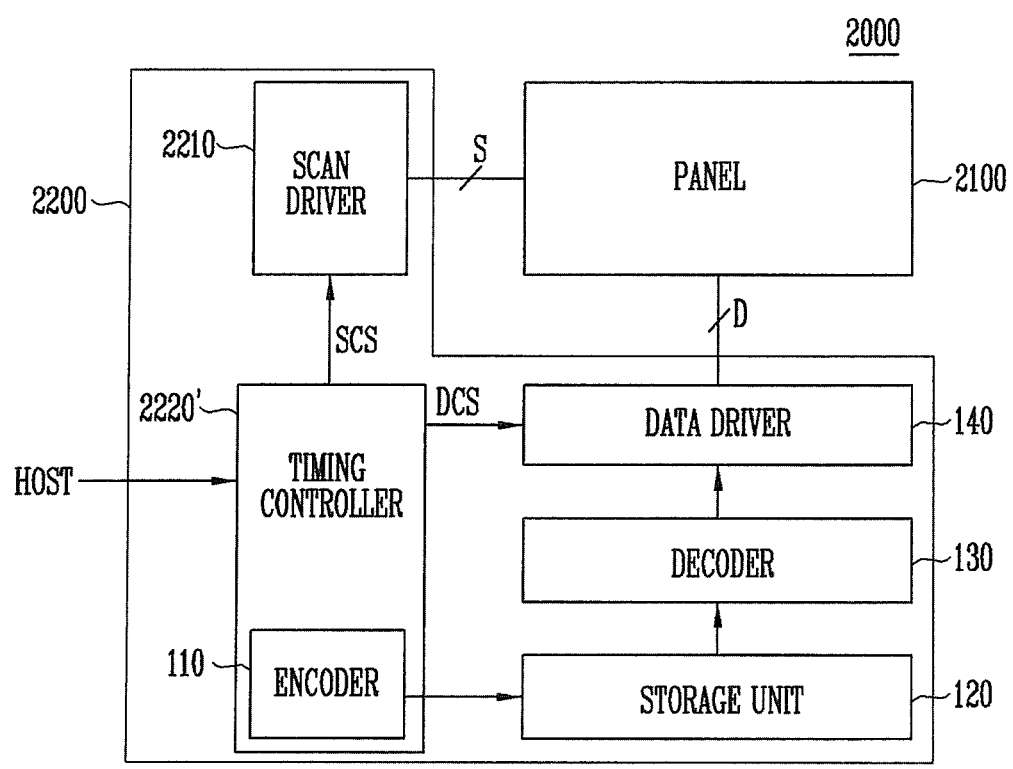
FIG. 12 is a diagram illustrating another embodiment of the display device including the display driving apparatus of the present invention.

Meanwhile, according to embodiments of the present invention, the encoder 110 may be included in a timing controller 2220' as shown in FIG. 12. This means that a data is compressed inside the timing controller 2220', and the compressed data is supplied to the storage unit 120.

By way of summation and review, a display device generally includes red sub-pixels, green sub-pixels, and blue sub-pixels, which are arranged in a stripe pattern. The stripe pattern is a pattern in which sub-pixels of the same color are arranged for each column.

However, when the sub-pixels are arranged in the stripe pattern, the aperture ratio is lowered by black matrices positioned between the respective sub-pixels, and the high-resolution expression performance is lowered.

In order to solve such a problem, "ClairVoyante Laboratories" has proposed a pixel arrangement structure called as "Pentile matrix color pixel arrangement". In the Pentile matrix color pixel arrangement, red and blue sub-pixels are alternately formed on the same column, and a green sub-pixel is formed on an adjacent column. If the Pentile matrix pixel arrangement structure is applied, the high-resolution expression performance can be improved. Further, a longitudinal line pattern caused by a specific pixel is not viewed, so that it is possible to improve image quality.

Meanwhile, the binary encoding method, the DPCM encoding method and the like have been proposed so that data with the Pentile matrix pixel arrangement structure can be compressed. However, in the binary encoding method and the DPCM encoding method, the error rate is increased when data of a specific pattern (e.g., a stripe pattern) is expressed, and therefore, the image quality may be lowered. Accordingly, it may be desirable to develop a compression method corresponding to the Pentile specific pattern.

In the display driving apparatus and the driving method thereof according to embodiments of the present invention, when a data of a specific pattern is input, the data is compressed using a pattern encoding method (e.g., a predetermined pattern encoding method). Here, the pattern encoding method is applied when a data of a specific pattern is input, and is previously set to decrease the compression rate of the specific pattern and the number of errors. That is, according to embodiments of the present invention, a data is compressed using the pattern encoding method (e.g., the predetermined pattern encoding method) corresponding to a specific pattern whenever the specific pattern is input. Accordingly, it is possible to improve the compression rate and to minimize the number of errors.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and their equivalents.

What is claimed is:

1. A display driving apparatus, comprising:
   a processor;
   a memory coupled to the processor, wherein the memory stores instructions that, when executed by the processor, cause the processor to implement:
   an encoder comprising a first compression unit and a second compression unit, the first compression unit and the second compression unit being configured to compress data of a Pentile method, using any one of a plurality of encoding methods, the first compression unit being configured to compress the data according to a pattern encoding method when the data corresponds to a specific pattern, the first compression unit being further configured not to compress the data when the data does not correspond to the specific pattern, the second compression unit being configured to compress the data according to one of a binary encoding method and a differential pulse code modulation (DPCM) encoding method when the data does not correspond to the specific pattern, the second compression unit being further configured not to compress the data when the data corresponds to the specific pattern;

a decoder configured to decompress the data compressed in the encoder according to a decoding method corresponding to the any one of the encoding methods; and a data driver configured to generate a data signal using the data decompressed in the decoder, wherein the encoder further comprises:

a block generator configured to generate blocks each comprising a plurality of sub-pixel data, each sub-pixel data respectively corresponding to the plurality of encoding methods and the pattern encoding method, wherein, when an (i−1) (i is a natural number) block comprises a last red sub-pixel data that once as a red sub-pixel data of an i block, and a last blue sub-pixel data once as a blue sub-pixel data of the i block, the first compression unit determines the data corresponds to the specific pattern and performs compression.

2. The display driving apparatus of claim 1, wherein the encoder is configured to pre-decompress the data compressed using the encoding methods, to compress the data using an encoding method of the encoding methods that has a smallest number of errors among the encoding methods, and to supply the data compressed using the encoding method to the decoder.

3. The display driving apparatus of claim 2, wherein, when the data corresponds to the specific pattern, the data compressed using the pattern encoding method is supplied to the decoder.

4. The display driving apparatus of claim 2, wherein the encoding methods comprise the binary encoding method and the differential pulse code modulation (DPCM) encoding method.

5. The display driving apparatus of claim 1, wherein the specific pattern is a stripe pattern in which four pixels implement white and three pixels implement black for each column.

6. The display driving apparatus of claim 1, wherein the encoder further comprises:

a plurality of second compression units comprising the second compression unit configured to compress the data respectively according to the plurality of encoding methods.

7. The display driving apparatus of claim 6, wherein the block generator is configured to generate a block comprising 16 sub-pixel data according to the pattern encoding method.

8. The display driving apparatus of claim 7, wherein, when red sub-pixel data in an i (i is a natural number) block are compressed, the first compression unit generates a first mode data corresponding to a pattern of three different red sub-pixel data having a last red sub-pixel data of an (i−1) block, and generates red first and second data by removing a least significant bit of each of two data except the last red sub-pixel data of the (i−1) block among the three different red sub-pixel data, and wherein, when blue sub-pixel data in the i block are compressed, the first compression unit generates a second mode data, corresponding to a pattern of three different blue sub-pixel data having a last blue sub-pixel data of the (i−1) block, and generates blue first and second data by removing a least significant bit of each of two data except the last red sub-pixel data of the (i−1) block among the three different blue sub-pixel data.

9. The display driving apparatus of claim 8, wherein the decoder is configured to add "1" as a lowest bit when the red first and second data and the blue first and second data are decompressed.

10. The display driving apparatus of claim 7, wherein the first compression unit is configured to generate a third mode data representing a position of a last green sub-pixel data of an (i−1) (i is a natural number) block, a fourth mode data corresponding to the pattern of the data except the last green sub-pixel data, and green first and second data obtained by removing a lowest bit from two different data, when green sub-pixel data in the i block are compressed.

11. The display driving apparatus of claim 10, wherein the decoder is configured to add "1" as a lowest bit when the green first and second data are decompressed.

12. The display driving apparatus of claim 6, wherein the encoder comprises:

a first pre-decompression unit coupled to the first compression unit, the first pre-decompression unit configured to decompress the data;

a plurality of pre-decompression units respectively coupled to the plurality of compression units, the plurality of pre-decompression units configured to decompress the data;

a first error calculation unit coupled to the first pre-decompression unit, the first error calculation unit configured to calculate an error;

a plurality of error calculation units respectively coupled to the plurality of pre-decompression units, the plurality of error calculation units configured to calculate an error;

a mode selection unit configured to output compression data corresponding to an error result of the first error calculation unit or one of the plurality of error calculation units; and a bit stream generator configured to generate a bit stream by adding a mode data representing a compression method to the compression data supplied to the mode selection unit.

13. The display driving apparatus of claim 1, further comprising a storage unit configured to store a data compressed in the encoder, and supply the stored data to the decoder.

14. A method of driving a display driving apparatus, the method comprising:

compressing an input data of a Pentile method using any one of a plurality of encoding methods;

compressing the input data according to a pattern encoding method in addition to the any one of the plurality of encoding methods only when the input data corresponds to a specific pattern and not compressing the input data according to the pattern encoding method when the input data does not correspond to the specific pattern;

calculating errors of the plurality of encoding methods and the pattern encoding method; and outputting the input data compressed according to an encoding method having a smallest number of errors among the plurality of encoding methods and the pattern encoding method, wherein, in the specific pattern, an (i−1) (i is a natural number) block has a last red sub-pixel data that is a red sub-pixel data of an i block, and a last blue sub-pixel data that is a blue sub-pixel data of the i block.

15. The method of claim 14, wherein, when the input data is the specific pattern, the pattern encoding method has the smallest number of errors.

16. The method of claim 14, wherein the compressing of the input data in the pattern encoding method comprises:
generating blocks comprising 16 sub-pixel data according to the pattern encoding method; and
respectively compressing a plurality of red sub-pixel data, a plurality of blue sub-pixel data, and a plurality of green sub-pixel data, which are in the block.

17. The method of claim 14, wherein, when red sub-pixel data in the i block are compressed, a first mode data is generated, corresponding to a pattern of three different red sub-pixel data having the last red sub-pixel data of the (i−1) block, and red first and second data are generated by removing a least significant bit of each of two data except the last red sub-pixel data of the (i−1) block among the three different red sub-pixel data.

18. The method of claim 14, wherein, when blue sub-pixel data in the i block are compressed, a second mode data is generated, corresponding to a pattern of three different blue sub-pixel data having the last blue sub-pixel data of the (i−1) block, and blue first and second data are generated by removing a least significant bit of each of two data except the last red sub-pixel data of the (i−1) block among the three different blue sub-pixel data, and
wherein, when green sub-pixel data in the i block are compressed, a third mode data representing a position of a last green sub-pixel data of the (i−1) block, a fourth mode data corresponding to the pattern of data except the last green sub-pixel data, and green first and second data obtained by removing a lowest bit from two different data are generated.

* * * * *